US012511172B2

(12) United States Patent
Gerphagnon et al.

(10) Patent No.: US 12,511,172 B2
(45) Date of Patent: Dec. 30, 2025

(54) HIGH-PERFORMANCE COMPUTING DEVICE WITH ADAPTABLE COMPUTING POWER

(71) Applicant: BULL SAS, Les Clayes-sous-bois (FR)

(72) Inventors: Jean-Olivier Gerphagnon, Vif (FR); Marc Levrier, Saint-Cyr-sous-Dourdan (FR); Matthieu Isoard, Teche (FR)

(73) Assignee: BULL SAS, Les Clayes-sous-Bois (FR)

( * ) Notice: Subject to any disclaimer, the term of this patent is extended or adjusted under 35 U.S.C. 154(b) by 570 days.

(21) Appl. No.: 17/714,975

(22) Filed: Apr. 6, 2022

(65) Prior Publication Data

US 2022/0318069 A1    Oct. 6, 2022

(30) Foreign Application Priority Data

Apr. 6, 2021   (EP) .................................... 21305437

(51) Int. Cl.
*G06F 9/50*   (2006.01)
*G06F 1/20*   (2006.01)
*G06F 9/48*   (2006.01)
*G06F 13/38*  (2006.01)

(52) U.S. Cl.
CPC ............ *G06F 9/5077* (2013.01); *G06F 1/206* (2013.01); *G06F 9/48* (2013.01); *G06F 9/4806* (2013.01); *G06F 9/4843* (2013.01); *G06F 9/4881* (2013.01); *G06F 9/4893* (2013.01); *G06F 9/50* (2013.01); *G06F 9/5005* (2013.01); *G06F 9/5027* (2013.01); *G06F 9/5044* (2013.01); *G06F 9/5061* (2013.01);

(Continued)

(58) Field of Classification Search
CPC ........ G06F 9/48; G06F 9/4806; G06F 9/4843; G06F 9/4881; G06F 9/4893; G06F 9/50; G06F 9/5005; G06F 9/5027; G06F 9/5044; G06F 9/5061; G06F 9/5072; G06F 9/5077; G06F 9/5083; G06F 9/5094

See application file for complete search history.

(56) References Cited

U.S. PATENT DOCUMENTS 10,917,357 B2    2/2021  Papaure et al.
10,970,113 B1 *  4/2021  Kurtzer ................. G06F 9/5005
(Continued)

FOREIGN PATENT DOCUMENTS

EP    3674897    7/2020
FR    3013473    3/2015
FR    3055716    3/2018

OTHER PUBLICATIONS

European Search Report issued in EP21305437.2, dated Oct. 15, 2021 (9 pages).

(Continued)

*Primary Examiner* — Charles M Swift
(74) *Attorney, Agent, or Firm* — ARC IP Law, PC; Joseph J. Mayo

(57) ABSTRACT

A high-performance computing device with adaptable computing power in which several high-performance computers exist that are isolated from each other to ensure data security. Each computer is run by a local resource manager that manages the computer at the node level. All or some of the local managers are managed via a global resource manager that the high-performance computing device manages at the level of the computers it contains.

13 Claims, 3 Drawing Sheets

(52) U.S. Cl.
CPC .......... *G06F 9/5072* (2013.01); *G06F 9/5083* (2013.01); *G06F 9/5094* (2013.01); *G06F 13/385* (2013.01)

(56) References Cited

U.S. PATENT DOCUMENTS

| | | | |
|---|---|---|---|
| 2010/0228861 A1* | 9/2010 | Arsovski ............... | G06F 9/5094 718/104 |
| 2014/0089511 A1* | 3/2014 | McLean ................ | G06F 9/5061 709/226 |
| 2015/0296016 A1* | 10/2015 | Bennett, Jr. ........... | H04L 63/104 709/213 |
| 2018/0069803 A1* | 3/2018 | Papaure .............. | H04L 67/1097 |
| 2019/0272016 A1* | 9/2019 | Frias ..................... | G06F 9/5094 |
| 2020/0210245 A1 | 7/2020 | Calegari et al. | |
| 2021/0004265 A1* | 1/2021 | Guim Bernat ............ | H02J 4/00 |
| 2021/0311765 A1* | 10/2021 | Subramanian ...... | G06F 9/45558 |
| 2022/0283869 A1* | 9/2022 | Tang ...................... | H04L 67/10 |

OTHER PUBLICATIONS

Zahid, et al., "Efficient network isolation and load balancing in multi-tenant HPC clusters", Future Generation Computer Systems, Apr. 1, 2016.

Microsoft: "Appendix 1: HPC Cluster Networking; Microsoft Docs", Jul. 29, 2016, pp. 1-26.

\* cited by examiner

HIGH-PERFORMANCE COMPUTING DEVICE WITH ADAPTABLE COMPUTING POWER

This application claims priority to European Patent Application Number 21305437.2, filed 6 Apr. 2021, the specification of which is hereby incorporated herein by reference.

BACKGROUND OF THE INVENTION

Field of the Invention

The invention relates to a high-performance computing device with adaptable computing power in a multi-organization context.

The technical field of the invention is that of high-performance computing devices. A high-performance computing device is also referred to as an HPC solution, a high-performance computer, a supercomputer, or a computer farm.

The invention relates to a high-performance computing device and in particular to a high-performance computing device with adaptable computing power.

The invention further relates to a high-performance computing device for use successively by different entities, in particular independent entities, an entity comprising at least one user.

Description of the Related Art

HPC devices are currently largely installed on-site (also called "on-premise") with the owner managing the entire infrastructure and resources. This model, which has been in place for more than 40 years, remains effective mainly for very large computational needs and/or on a constant basis. As a result, computing resources such as high-performance computing devices are often limited to large computing centers, research laboratories or industrial companies. In these situations, the available computing power is limited and only changes during renewal cycles of 3 to 7 years.

Resources, in a HPC device, are currently managed at the node granularity level. This means that the allocation unit for running jobs is usually the number of nodes needed, or the number of compute cores, since a node can contain multiple cores.

A high-performance computing device consists of a large number of compute nodes assembled in racks. These racks are installed in data centers. Administration, management, replacement, maintenance, etc. are operations managed by the operations team (or by a third-party company under contract to the operator). This operation covers installation, power, cooling, and the day-to-day administration of the solution, that is both the infrastructure and the resources. This is the on-premises model.

For a few years now, other models, in particular the "as a service" model, have become standard in other areas of IT. In the context of high-performance computing, these models remain rather limited with rare examples such as Cray™ machines at Azure (Microsoft™) with rather limited and currently financially unconvincing lease-as-a-service solutions.

One of the main bottlenecks is the initial investment for the purchase of computers by a company that wants to offer HPC as a service. Indeed, high-performance computing resources remain highly specialized: specific computing cores, specific high-speed and low-latency networks, parallel storage, specific applications requiring direct access at the component level (also known as "bare-metal/OS" access).

In this "as a service" context, the constraints of the specificity of the work to be launched, of security and of non-sharing, have dramatic consequences on the performance and/or the cost, though these are what is sought when using a high-performance computing device. Being able to reconcile these aspects remains a major challenge, and one that has not yet been overcome, for companies that are more used to managing hardware that is as standard as possible, also known as multi-use hardware. However, there have been attempts. Among these attempts there are two main ones:

Use of resources not specific to the HPC domain;
Use of resources specific to the HPC domain.

In the first case, it is exactly the same as standard "as a service", that is a model wherein totally standard hardware is used without any real consideration of the adequacy with the needs of the work to be done. It is a best effort model that offers no guarantee of performance or efficiency in the execution of the work. This model is, on paper, inexpensive because it uses initially inexpensive resources. However, in reality, running HPC jobs on this type of resource makes no sense because the execution time is greatly degraded (several hours instead of a few minutes). This lengthening of the time to obtain the result, and thus of the use of the computing resources, causes inflated energy consumption, which becomes disproportionate when compared to the use of specific resources. The cost of commercial scientific software can also become prohibitive in such a context of under-utilized license tokens (which can be indexed to the number of allocated cores, the duration of the computing, etc.). This model remains however very interesting for 'small high-performance computing' that is the execution of a code from time to time without a real desire to have a more constant load/need. This model is trivial in its implementation because it uses the mechanisms already in place with hosted solution providers as a service.

In the second case, the issue is to compare the installation investment to the utilization rate of the specific resource. Indeed, it is commonly accepted that a high-performance computing device is all the more relevant as its utilization rate approaches 100%. It is therefore necessary to be able to find enough users with the same need, in terms of power, and/or who accept low security. This is a complex dilemma considering that HPC infrastructures generally have life cycles (hardware replacement/obsolescence) of 3 to 5 years and in some cases up to 8 years. If you size the hardware too large, you risk finding fewer users, and therefore you will have a lower utilization of resources. If you don't size the system efficiently enough, users won't see the difference from the first case and will be tempted to go and use a competing solution that can meet their needs.

Security considerations should not be ignored. Indeed, in the first case, the security management is conventional, ultimately involving trust in the solution provider, since there is no way to check or control the underlying infrastructure, which is entirely under the provider's management. Indeed, in this model, access to resources is never native (bare-metal/OS) but is done via virtualization layers (OS, network, storage, etc.). This has, as already mentioned, a significant impact on application performance in the context of HPC.

In the second case, the question of shared elements should be mentioned, because in a high-performance computing device, the infrastructure (network, administration, storage, etc.) is entirely shared between the users of the high-performance device, making certain information 'visible'. This puts data and jobs at risk if any part of the solution is compromised (whether it is a node, switch, etc.). In an on-premises solution, the users are globally controlled (same company, partners, etc.) whereas in a solution as a service the users can be competing companies. The chosen solution is to reserve a high-performance device for each entity to avoid this risk, but in this case, it is impossible to correctly size the high-performance device because the needs of the different entities are too heterogeneous.

There is therefore no satisfactory solution in the state of the art.

BRIEF SUMMARY OF THE INVENTION

At least one embodiment of the invention provides a solution to the above problems by allowing the power of an adaptable high-performance computing device to be used securely by multiple entities. This adaptability is achieved by distributing the resources of a high-performance computing device in such a way as to build several high-performance computers, the resulting computers being physically isolated from each other.

At least one embodiment of the invention concerns a high-performance computing device with adaptable computing power, characterized in that it comprises a plurality of high-performance computers, a local resource manager dedicated to each computer, at least one global resource manager connected to a computer state database, each of the computers of the high-performance computing device:
 being physically isolated from the other computers of the high-performance computing device;
 having at least one construction unit with at least the following blocks:
 Power supply;
 Network
  For management and/or
  For interconnection;
 Computing comprising a plurality of compute nodes;
 being configured to be associated with the dedicated local resource manager, the local resource manager having access to the management network of the computer and being configured to manage the computer's plurality of compute nodes;
access to a computer being via the associated local resource manager that is itself accessible via the global resource manager based on the content of the computer state database.

Thus, the resources required for the operation of the high-performance computing device are used to operate several computers. None of the resulting computers reaches the combined power of all the resources of the HPC device, but each computer corresponds to a specific need and is therefore likely to correspond to an existing need. The overall utilization rate of the HPC system is therefore increased.

In addition to the features just mentioned in the preceding paragraph, the device according to at least one embodiment of the invention may have one or more additional features from the following, considered individually or in any technically possible combinations:
 the state database is configured to associate with a computer a description of the compute nodes of the computer, this description including at least the number and type of the compute nodes,
 a compute node is associated with at least one type from the list of at least the following types: processor, graphics processor, artificial intelligence acceleration processor, programmable gate arrays,
 the state database is configured to associate with an computer an access mode among at least the following modes:
  Exclusive, reserving the computer for one entity;
  Shared, allowing several entities to access the computer at the same time.
 an entity has at least one user,
 the state database is configured to associate a number of allocated compute nodes with a computer,
 the at least one construction unit comprises a cooling block,
 at least one computer comprises a plurality of building blocks, the management network blocks and/or interconnection network blocks being connected to each other within the computer,
 a computer has a high-speed connector for accessing external non-transitory storage means.

The invention and its various applications will be better understood by reading the following description and examining the accompanying figures.

BRIEF DESCRIPTION OF THE DRAWINGS

The figures are presented as an indication and in no way limit the invention.

DETAILED DESCRIPTION OF THE INVENTION

The figures are presented as an indication and in no way limit the invention.

Unless otherwise specified, the same element appearing in different figures has a single reference.

Figure 1:
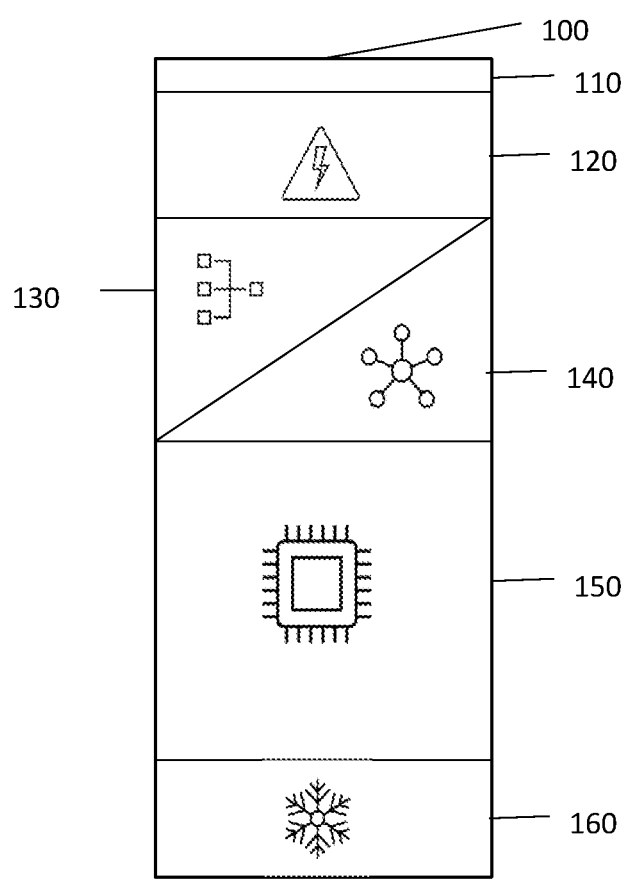
FIG. 1 shows a schematic illustration of a construction unit of a high-performance computing device according to one or more embodiments the invention.

FIG. 1 shows a construction unit 100 of a high-performance computing device according to one or more embodiments the invention. The figure shows that the construction unit 100 includes:
 An optional block 110, for managing the construction unit 100 that allows for the installation of, for example, a local resource manager that manages the allocation of computational resources for performing computational tasks. One such manager is, for example, the software "Sturm";
 A power supply unit 120: this is an interface that allows electrical power supplied to the construction unit 100 to be distributed among all the components of the construction unit 100;
 A management network block 130: these are components, such as switches that enable the establishment of a network for the management of the components of the construction unit 100. This management is, for example, the submission of tasks, the reading of measurement probes to evaluate the operating state of components, the sending of configuration instructions, the connection of the construction unit 100 with devices external to the construction unit 100 such as storage cabinets, etc. Typically such a network is realized with Ethernet components;

An interconnection network block 140: these are switch-type components that allow the components of the computing block 150 of the construction unit 100 to communicate with each other. Typically such a network is realized with "Infiniband" components or equivalent in terms of throughput and latency;

A computing block 150: these are computing components. This is also known as a compute node. Compute nodes can be of various kinds, as we will see below. In general, within a construction unit 100, all the compute nodes are of the same nature, but this is not a requirement;

A cooling block 160: these are components that make it possible to capture the heat produced by the other components of the construction unit 100 and discharge it outside the construction unit 100. This block is optional. Indeed, depending on the technologies used, present or future, and the area, in particular the geographical area, of the installation, it is not mandatory to provide dedicated cooling.

According to one or more embodiments, a single network block can be used for management and interconnection.

The computing block 150 has at least one compute node. A compute node can be one of at least one of the following types:

Processor also called CPU for Computing Processing Unit;

Graphics processor also called GPU for Graphical Processing Unit;

Artificial intelligence acceleration processor also called NPU for Neural Processing Unit;

Field-programmable gate array also called FPGA.

It is obvious that this list of types cannot contain all the types, especially not those to come. At least one embodiment of the invention is of course transposable with any type of computing unit.

For a computing block 150, the number of nodes can be up to 96 nodes. Thus, construction units 100 with a variable number of computational nodes of a variable type can be used.

In practice, all these blocks are assembled in a cabinet. Such a cabinet is also called a rack.

In one or more embodiments the invention of the invention, it is possible for a construction unit 100 to also include a storage block having non-transitory recording means such as a hard drive, SSD (solid state drive) or other mass storage means. In this variant, this storage block makes it possible to store input data for computational tasks and output data resulting from the execution of these tasks.

From such a construction unit 100 it is possible to create high performance computers of any size, by assembling the desired number of construction units 100. To create a high-performance computer with two construction units 100, links are established between the management networks of these two construction units 100 and between the interconnection networks of these two construction units 100. The construction units 100 are said to be assembled. The same procedure is followed with any number of construction units 100 to obtain the desired computing power.

Figure 2:
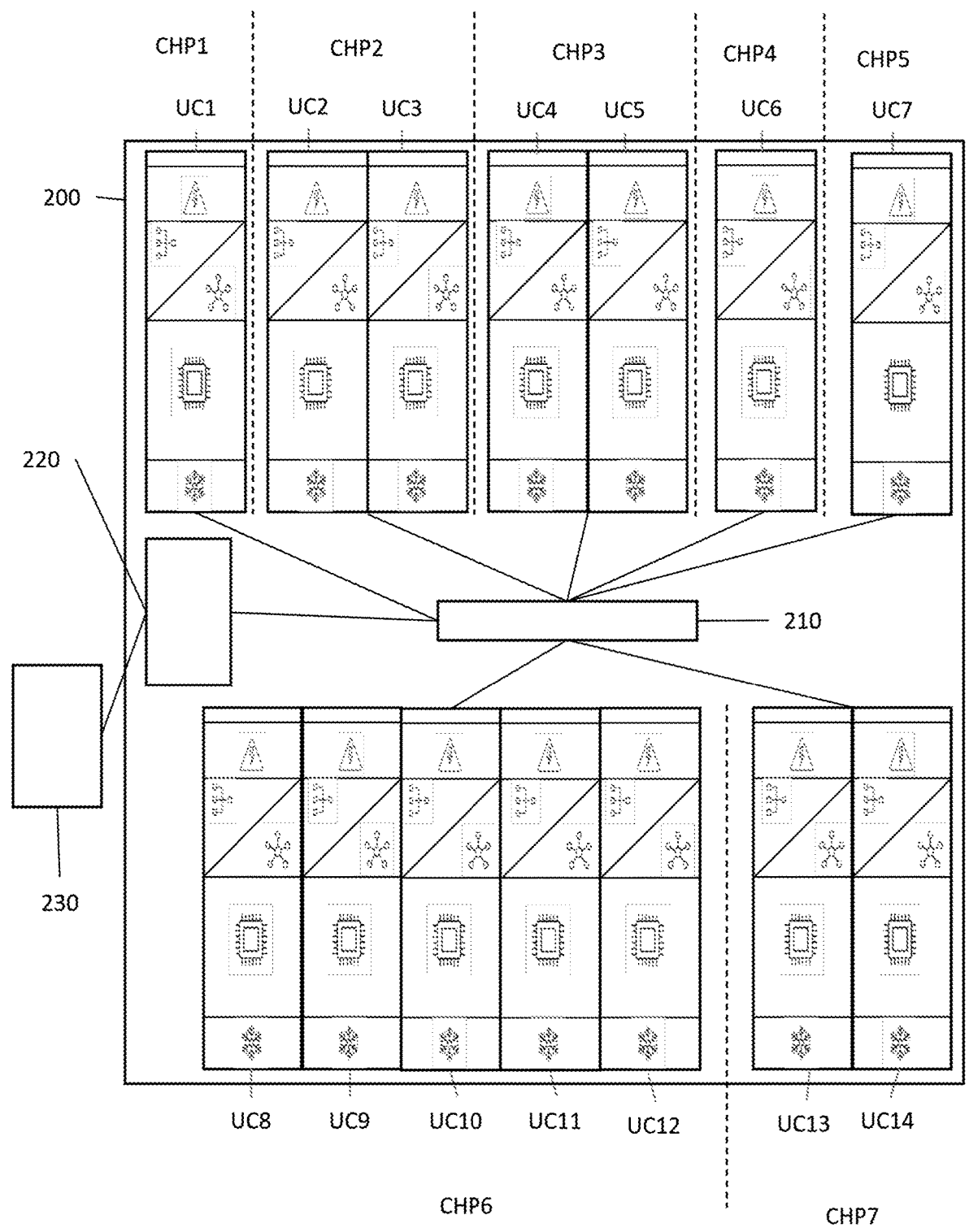
FIG. 2 shows an illustration of a high-performance computing device according to one or more embodiments the invention.

FIG. 2 shows a high-performance computing device 200, according to one or more embodiments the invention, that comprises fourteen construction units 100 designated UC1 through UC14. These fourteen construction units 100 make it possible to build, in the configuration used in the example, seven high-performance computers designated from CHP1 to CHP7.

FIG. 2 shows that the fourteen construction units 100 are assembled as follows:

CHP1: UC1 alone;
CHP2: UC2 and UC3 assembled;
CHP3: UC4 and UC5 assembled;
CHP4: UC6 alone;
CHP5: UC7 alone;
CHP6: UC8, UC9, UC10, UC1 and UC12 assembled;
CHP7: UC13 and UC14 assembled.

This results in a high-performance computing device 200 with an overall power corresponding to that of fourteen construction units 100, the power of which can be adapted by using any of the high-performance computers CHP1 to CHP7 assembled from these fourteen construction units 100.

It is to be noted here high performance devices and high performance computers are being discussed. This is a language convention used in this document to differentiate the whole from the parts. The whole is a high-performance computing device with adaptable power. One part is a high-performance computer having a plurality of compute nodes.

Each computer CHP1-CHP7 is physically isolated from the other computers CHP1-CHP7 in the high-performance computing device 200, meaning that the interconnection networks of the high-performance computers CHP1-CHP7 are separate.

FIG. 2 shows that the high-performance computing device 200, according to one or more embodiments the invention, comprises a management switch 210 to which the high performance computers CHP1-CHP7 of the high-performance computing device 200 are connected. In at least one embodiment, the management switch 210 is configured to prohibit communications between the computers CHP1-CHP7. Thus, the computers CHP1-CHP7 are isolated including at their management networks. There is therefore no possibility for a task executed by a computer CHP1-CHP7 to access another computer CHP1-CHP7.

FIG. 2 shows that the high-performance computing device 200, according to one or more embodiments the invention, comprises a global manager 220 connected to the switch 210. In one embodiment, the global manager 220 is not physically included in the high-performance computing device 200 but merely connected to the management switch 210.

A computer CHP1-CHP7 is thus accessed via the global manager 220 which, depending on an authentication, will or will not grant access to a computer CHP1-CHP7. This access is granted via access to the local resource manager 110 of the computer CHP1-CHP7.

According to one or more embodiments of the invention, the local resource manager is implemented at the computer level via the management block 110 or via an external, physical or virtual resource. If it is an external resource, then it is connected to the computer via the management switch 210. This connection is then secured by setting up a vlan network and/or a vpn network. This ensures the isolation and security of the data passing between the external local manager and the computer CHP1-CHP7.

The global manager 220 and the local managers are realized, for example, by an implementation of the software "Slurm".

In at least one embodiment, each user entity connects to the global manager 220 to access the computers CHP1-CHP7 for which it has obtained user authorizations. The term "entity" here is employed as a means of grouping users who do not need to be isolated from each other. One example is a research laboratory with two researchers. In this case, the laboratory is an entity that includes two users. This is a conventional multi-entity architecture. It is possible for an entity to be a single user, in which case the entity and the user are as one.

In the case where an entity wants total isolation, it is possible to offer a dedicated solution for each entity, in which there is one global manager per entity.

Usage authorizations are allocated on a schedule basis according to the needs expressed by the entities. This is done in such a way that at a given date, the sum of the needs corresponding to authorized entities does not exceed the power available at the high-performance computing device 200.

FIG. 2 shows a state database 230 of the high-performance computing device 200, according to one or more embodiments the invention. This state database 230 is implemented such that it is accessible to the global resource manager 220. This state database contains a description of the computers CHP1-CHP7. This description includes at least the number of compute nodes available to each computer CHP1-CHP7. In a preferred variant, this description also includes the types of these nodes. It is therefore easy to select a computer CHP1-CHP7 according to a need.

The computing blocks of the assembled computers CHP1-CHP7 may or may not be identical. For example, one possible configuration, for some of the assembled computers, is:
  CHP1 computer: 96 CPU nodes in the computing block;
  CHP4 computer: 48 CPU nodes in the computing block;
  CHP5 computer: 64 GPU nodes in the computing block.

This information about the assemblies realized is stored in the state database 230. It is to be noted that the performance of the interconnection network used for the assembly of the computer CHP1-CHP7 can also be recorded. It is indeed possible that from one standard to another, the performance varies. It is also possible to have a high-performance computer without an interconnection network, that is without the possibility for processes running on different nodes to communicate with each other.

The database 230 also comprises a reservation schedule for the computers. Such a schedule allows for the combination of:
  An entity identifier;
  A computer identifier;
  A time period.

It is thus possible to know when and by whom a computer has been reserved, and therefore by process of elimination, when and which computers are free. Such an association is called a lease. In practice, this schedule is managed by a task scheduler at the level of the global manager 220. One such scheduler is, for example, the software "Slurm".

In at least one embodiment of the invention, the schedule also allows for a number of reserved compute nodes and an access mode to be associated with a lease. An access mode is either exclusive or shared. Thus, if an entity needs 48 compute nodes and the smallest computer has 96 nodes, said entity can choose to reserve it in shared mode. That computer then remains available to an entity that needs 48 or fewer compute nodes and accepts the shared mode. On the other hand, the exclusive mode guarantees that no other entity will be able to access the computer during the lease. The exclusive mode applies at the entity level and at the user level:

At the entity level, the computer can be shared by several users of the same entity;
At the user level, the computer can only be used by one user.

Figure 3:
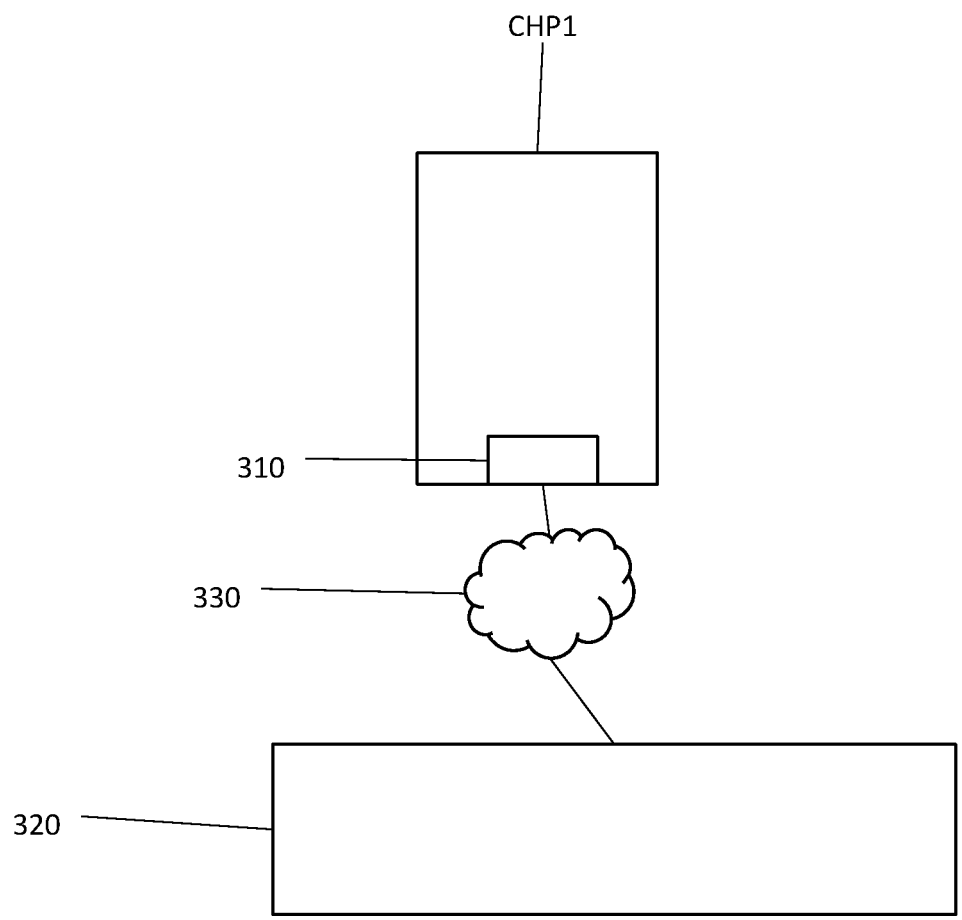
FIG. 3 shows an illustration of a detail of a device according to one or more embodiments the invention for accessing external storage means.

FIG. 3 shows that a high-performance computer, for example the computer CHP1, according to one or more embodiments the invention, comprises a high-speed connector interface 310 for accessing non-transitory storage means 320 via a network 330. The network 330 is configured to prevent communications between computers CHP1-CHP7.

In at least one embodiment, the physical connection of the storage servers within the storage server cluster will be through an "InfiniBand", "BXi" or equivalent interconnection network with end-to-end authentication security, for example token-based, to allow mounting and access to file systems and files only for authorized nodes and listed users. It is not possible in such a model to limit security as in an on-premises solution that determines that if a node has access to the interconnection network, it can mount a Lustre or GPFS (General Parallel File System) file system. In at least one embodiment of the invention, the identity and authorizations of both the nodes requesting access to the mounting and those of the users requesting the data are guaranteed. This allows the management of different rights for users of the same entity.

In a high-performance computing context, non-transitory storage is currently based on parallel file systems such as Lustre or IBM Spectrum GPFS. These file systems use a battery of storage servers to parallelize accesses (read or write) to provide much higher performance in terms of throughput and IOPS than a standard file system (whether network or local). File systems are generally very stable in terms of configuration and are established in a permanent manner in centers with on-premises computers. In at least one embodiment of the invention, the situation is different because the data are transitory data that will have to be deleted after the execution of the work or after the end of a lease of a supercomputer.

One or more embodiments of the invention can therefore be implemented with at least two designs:
  The first model is called perennial and is dedicated to an entity that would make repeat requests for computing resources; these requests are not necessarily the same, and therefore do not necessarily relate to the same computer each time;
  A second model called ad-hoc makes it possible to store the input and/or output data for a set period of time. This time period must be greater than the time period of the lease of the computing resources and must therefore be managed in parallel with them.

For the first model, logical construction units are configured on the storage means 320 on which the data of an entity X will be stored in a perennial way, that is over the duration of a specific lease for the storage. The configuration of the logical units, size, performance and persistence time, is left to the discretion of the users. The state database 230 then contains a description of these logical construction units. Each of these logical construction units has an identifier that is associated with an entity. Thus when a user of the entity uses a high performance computer CHP1-CHP7, they can choose a logical construction unit to attach to that computer CHP1-CHP7 as a non-transitory storage means. In this model, the lifetimes of the storage logical construction units are independent of the durations of the leases for the computers.

The storage medium is therefore a partition in a disk array, also called NAS.

For the second model, a logical building block is automatically configured at the time the lease is established, and is mounted as a storage unit for the high-performance computer CHP1-CHP7 subject to the lease. This logical construction unit is destroyed at the end of the lease.

The first model is interesting because it makes it possible to store configurations for local resource managers 110. Such a configuration can be used to configure the local resource manager 110 of a high-performance computer CHP1-CHP7 to make it available more quickly. It is then also easy to switch from one saved configuration to another saved configuration.

A user cycle for a high-performance computing device 200 by a user of an entity is, for example:

Deposit data to be processed on non-transitory storage means associated with the entity;

Processing request, by the user via an interface, of the deposited data by specifying which computing power is desired: number and type of nodes, speed of the interconnection network etc., while also specifying the mode of access to the computer: exclusive or shared, while also specifying the data to be used on the nodes to carry out the work;

Analysis of the request by the global resource manager 220. This analysis is traditionally done in three steps:

First step: Is a computer already allocated to the same entity and if so, are there enough resources available on it? Has the exclusive cluster criterion been selected? If no available computer exists for the entity, the search is performed on all the computers available, that is the computers without work to do or the computers working in shared mode;

Second step: scheduling the request once the computer has been found. This scheduling can be immediate or deferred depending on the availability of the computers.

Third step: allocation of resources and implementation of the work requested.

All of these steps use and update data in the state database 230 of the high-performance computing device 200 according to one or more embodiments the invention.

The actual allocation of resources. Once the global 220 manager has found the resources and they become available, the allocation is effective. Resources become available when the work for which they were mobilized is completed. The user is left with a list of nodes for use in the same way as in the case of an on-premises computer. Their work can be executed with the prior mounting of the file systems on which the data have been deposited, the setting of reference images given or requested by the user, and the setting of the user's identifications. At this point, the computer deploys autonomously and automatically for the user with the parameters the user has specified. At this point, the user has access to the local resource manager as if it were an on-premises installation.

Execution of the work on the resources. The work is carried out in the same way as on an on-premises installation and with the same constraints and facilities. Interactive access to the nodes can be granted in various ways, via SSH connections and through a dedicated VPN. The user is strictly in a context similar to an execution on a local computer.

Once the job is completed, the corresponding resources are released and reset. This can be done, for example, by installing a blank image or a reference image or by blocking the nodes. All the user contexts are deleted, as well as the information on the computer itself. These contexts are the data, at the computer level, associated with the user. The user's identification data can remain stored in a database external to the computer. The local manager of the computer is, according to one or more embodiments of the invention, saved on storage dedicated to the user so that it can be used as a record of the work done, or reused for other work. This database contains information about the jobs submitted by the user. This database, in the case of a computer dedicated to a company in a perennial way, can be preserved between different jobs. At the end of this step, no information can be found on the computer about previous jobs.

Data retrieval: data is stored in a user- or entity-specific file system. These must be retrieved within a predefined period of time (ad-hoc mode) in a secure manner unless the storage is perpetuated at the request of the entity (perennial mode). Once the time limit is exceeded in the ad-hoc mode, the data is deleted and the file system destroyed. This is of course a logical destruction.

With at least one embodiment of the invention, two levels of granularity are managed: The compute node level by local resource managers 110, and the computer level by the global resource manager 220. This makes it possible to maximize the utilization of the HPC device 200 while ensuring good isolation between users who have bare-metal/OS access.

The invention claimed is:

1. A high-performance computing device with adaptable computing power, wherein said high-performance computing device comprises:

a plurality of high performance computers, a local resource manager dedicated to each computer of the plurality of high performance computers, at least one global resource manager connected to a computer state database, a management switch connected to the plurality of high performance computers and to said at least one global resource manager, wherein said each computer of the plurality of high performance computers is physically isolated from other computers of the plurality of high performance computers;

comprises at least one construction unit, wherein said at least one construction unit comprises a power supply block comprising an interface that allows power supplied to the at least one construction unit to be distributed among all components of the at least one construction unit;

a network block, wherein said network block comprises one or more of a management network block for management, an interconnection network block for interconnection;

computing components with a plurality of compute nodes;

is configured to be associated with the local resource manager, wherein the local resource manager has access to a management network of the each computer and is configured to manage the plurality of compute nodes of the each computer;

wherein access to said each computer is via the local resource manager that is itself accessible via the at least one global resource manager based on content of the computer state database;

wherein said management switch is configured to prohibit communications between the plurality of high performance computers, such that the plurality of high performance computers are isolated at the network block, and such that a task executed by a first high performance computer cannot access another high performance computer of said plurality of high performance computers to ensure data security;

wherein usage authorizations are allocated on a schedule basis according to needs expressed by one or more authorized entities, such that at a given date, a sum of the needs corresponding to the one or more authorized entities does not exceed said power available at the high-performance computing device.

2. The high-performance computing device according to claim 1, wherein the computer state database is configured to associate a description of the plurality of compute nodes of the each computer with the each computer, wherein said description includes at least a number and type of the plurality of compute nodes.

3. The high-performance computing device according to claim 1, wherein a compute node of the plurality of compute nodes is associated with at least one type from a list of types comprising a processor, a graphics processor, an artificial intelligence acceleration processor, a programmable gate arrays.

4. The high-performance computing device according to claim 3, wherein the computer state database is configured to associate an access mode with the each computer, wherein said access mode comprises one or more of
an exclusive mode, reserving the each computer to one entity of said one or more authorized entities;
a shared mode, allowing several entities of said one or more authorized entities to access the each computer at a same time.

5. The high-performance computing device according to claim 4, wherein an entity of the several entities comprises at least one user.

6. The high-performance computing device (200) according to claim 1, wherein the computer state database is configured to associate said each computer with a number of allocated compute nodes of the plurality of compute nodes.

7. The high-performance computing device according to claim 1, wherein the at least one construction unit comprises a cooling block.

8. The high-performance computing device according to claim 7, wherein at least one computer of the plurality of high performance computers comprises one or more of a plurality of building blocks, the management network block and the interconnection network block connected to each other within the at least one computer.

9. The high-performance computing device according to claim 1, wherein said each computer further comprises a high-speed connector for accessing external non-transitory storage means.

10. The high-performance computing device according to claim 1, wherein said computer state database comprises a reservation schedule for the plurality of high performance computers, wherein said reservation scheduler is managed by said at least one global resource manager, wherein said reservation schedule allows for a combination of an identity identifier, a computer identifier and a time period, such that said high-performance computing device knows when and by which entity of said one or more authorized entities at least one high performance computer of said plurality of high performance computers is reserved and which one or more high performance computers of said plurality of high performance computers are free.

11. The high-performance computing device according to claim 4, wherein in the shared mode, a first entity of said one or more authorized entities is capable of reserving an amount of compute nodes of said plurality of compute nodes of a first high performance computer of said plurality of high performance computers that is less than all of said plurality of compute nodes, such that remaining compute nodes of said plurality of compute nodes of said first high performance computer remains available to another entity of said one or more authorized entities.

12. The high-performance computing device according to claim 4, wherein said exclusive mode guarantees that only said one entity of said one or more authorized entities is able to access said each computer as the same time.

13. The high-performance computing device according to claim 4, wherein the exclusive mode is applied at an entity level and at a user level, such that
at the entity level, the each computer is configured to be shared by several users of said one entity, and,
at the user level, the each computer is configured to only be used by one user of said one entity.

* * * * *